United States Patent
Pang et al.

(10) Patent No.: US 12,105,634 B2
(45) Date of Patent: Oct. 1, 2024

(54) TRANSLATION LOOKASIDE BUFFER ENTRY ALLOCATION SYSTEM AND METHOD

(71) Applicant: ATI TECHNOLOGIES ULC, Markham (CA)

(72) Inventors: Edwin Pang, Markham (CA); Jimshed Mirza, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/486,131

(22) Filed: Sep. 27, 2021

(65) Prior Publication Data

US 2023/0103230 A1  Mar. 30, 2023

(51) Int. Cl.
*G06F 12/10* (2016.01)
*G06F 12/1027* (2016.01)

(52) U.S. Cl.
CPC ...... G06F 12/1027 (2013.01); *G06F 2212/68* (2013.01)

(58) Field of Classification Search
CPC .......................... G06F 12/1027; G06F 2212/68
USPC ........................................................ 711/207
See application file for complete search history.

(56) References Cited

U.S. PATENT DOCUMENTS

| | | | |
|---|---|---|---|
| 5,897,664 A | 4/1999 | Nesheim | |
| 7,549,035 B1 | 6/2009 | Cameron et al. | |
| 10,241,925 B2 * | 3/2019 | Mirza | G06F 12/1009 |
| 10,552,338 B2 * | 2/2020 | Abhishek Raja | G06F 12/1027 |
| 10,915,459 B2 * | 2/2021 | Campbell | G06F 12/1009 |
| 2002/0129115 A1 | 9/2002 | Noordergraaf et al. | |
| 2011/0231593 A1 | 9/2011 | Yasufuku et al. | |
| 2012/0151116 A1 | 6/2012 | Tuch et al. | |
| 2014/0281363 A1 | 9/2014 | Tian | |
| 2016/0188486 A1 | 6/2016 | Soh | |
| 2016/0378674 A1 | 12/2016 | Cheng et al. | |
| 2017/0277634 A1 | 9/2017 | Basu et al. | |
| 2018/0189190 A1* | 7/2018 | Kaplan | G06F 9/45545 |

OTHER PUBLICATIONS

U.S. Appl. No. 16/256,634, filed Jan. 24, 2019 listing Gabriel H. Loh et al. as inventor(s), entitled "Cache Replacement Based On Translation Lookaside Buffer Evictions".

U.S. Appl. No. 15/826,061, filed Nov. 29, 2017 listing Nuwan Jayasena et al. as inventor(s), entitled "Lightweight Address Translation for Page Migration and Duplication".

* cited by examiner

*Primary Examiner* — Hua J Song

(57) ABSTRACT

A processing system includes a translation lookaside buffer (TLB). The TLB includes a plurality of TLB entries that are configured to store requested page size indications. The TLB is configured to be indexed via the requested page size indications such that a plurality of TLB requests that each indicate a same virtual address, but different respective requested page sizes are allocated respective TLB entries. As a result, in response to a TLB request that indicates a requested page size and has a virtual address that corresponds to multiple TLB entries, only a single TLB entry is identified as a TLB hit.

20 Claims, 5 Drawing Sheets

TRANSLATION LOOKASIDE BUFFER ENTRY ALLOCATION SYSTEM AND METHOD

BACKGROUND

Many processing systems use virtual memory for handling data accesses by executing programs (e.g., applications, operating systems, device drivers, etc.). In such a processing system, programs access memory using "virtual addresses" in "virtual address spaces," which are local address spaces that are specific to corresponding programs, instead of accessing memory using addresses based on the physical locations (or "physical addresses") of blocks of memory (or "pages"). Thus, to support memory accesses, the processing system typically employs address translation circuitry to translate the virtual addresses to corresponding physical addresses.

In order to enable the virtual address to physical address translation, the computing device includes a page table, which is a record stored in a memory of the computing device that includes an entry, or a "page table entry," with virtual address to physical address translation information for pages of data that are stored in the main memory. Upon receiving a request from a program to access memory at a given virtual address, a processor acquires corresponding physical address information from the page table by performing a page table walk, during which the page table is searched for a page table entry that provides the physical address associated with the virtual address. Because page table walks are relatively slow, the processing system includes a translation lookaside buffer (TLB), which is a local memory device in the processor that stores a limited number of copies of page table entries acquired during page table walks (or information based on page table entries). During operation, the processor first attempts to acquire page table entries from the TLB for performing virtual address to physical address translations.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
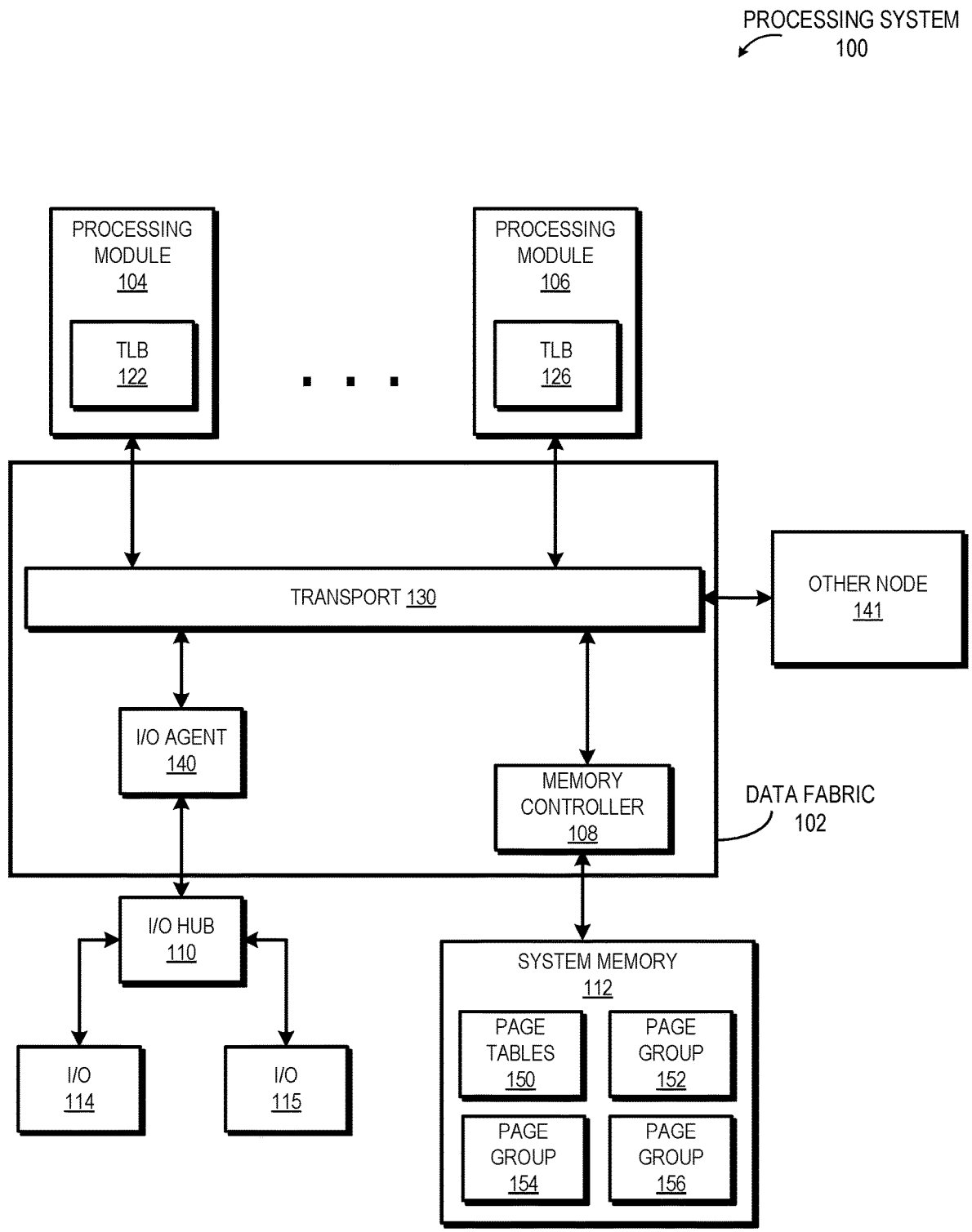
FIG. 1 is a block diagram of a processing system in accordance with some embodiments.

A translation lookaside buffer (TLB) is used to translate virtual addresses to physical addresses for programs. Additionally, in a system where pages having different sizes are allocated to the programs, the TLB stores indications of the sizes of the pages that store the physical addresses. However, if the size of the page in TLB requests for a program (e.g., due to programmer error) are inconsistently indicated, in some cases, erroneous operation, security vulnerability, or both occurs. In some cases, these problems are avoided by indexing the TLB based on the indications of the sizes of the associated pages. As a result, in some embodiments, if two TLB requests for a program are sent that correspond to a same page but where one TLB request indicates a first page size and the other TLB request indicates a second page size, the TLB requests are added to different entries of the TLB.

As further described below with reference to FIGS. 3 and 4, in some cases, a system provides pages of multiple sizes (e.g., 16 kilobyte (KB) and 64 KB) to programs. However, in some cases, when page sizes are inconsistently used, in some cases, erroneous operation, security vulnerability, or both occurs. In an example system, a 16 KB page is indicated in a TLB request for a program. In the example, the TLB allocates a TLB entry as if a 16 KB page will be returned. If another TLB request is received for the program that indicates a virtual address of 16 KB and indicates a 64 KB page, the TLB allocates a TLB entry as if a 64 KB page will be returned. However, if a 64 KB page is returned, in response to the request that indicated the 16 KB page, and if the programmer meant to request a 64 KB page (e.g., so both requests should correspond to the same page), in the example, the TLB now has two entries that correspond to the same page. In the example, the TLB is designed assuming that only one entry will result as a hit for a request. Accordingly, if the TLB receives a TLB request that indicates an address that corresponds to both entries (e.g., 26 KB), various problems could occur such as the TLB registering hits on the two entries as a hit on a different TLB entry, which, in some cases, results in retrieving stale data or data from another program. As a result, in some cases, the program runs erroneously or is a security threat. However, if the TLB entries are additionally indexed based on an indicated page size, in the above example, only the second entry is identified as a TLB hit.

The techniques described herein are, in different embodiments, employed using any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). For ease of illustration, reference is made herein to example systems and methods in which processing modules are employed. However, it will be understood that the systems and techniques described herein apply equally to the use of other types of parallel processors unless otherwise noted.

FIG. 1 illustrates a processing system 100 that uses a TLB to map virtual addresses to physical addresses in accordance with at least some embodiments. The processing system 100 includes a data fabric 102 used to interconnect various components of processing system 100, including a plurality of processing modules, such as processing modules 104-106, one or more memory controllers 108, and one or more I/O hubs 110. Each memory controller 108 in turn is coupled to one or more system memories, such as system memory 112, and each I/O hub 110 is in turn coupled to one or more I/O devices, such as I/O devices 114, 115. In the illustrated embodiment, processing modules 104 and 106 include TLBs 122 and 126, respectively. However, in other embodiments, one or more of TLBs 122 and 126 are located elsewhere (e.g., separately connected to data fabric 102 or in memory controller 108).

Processing modules 104-106 include one or more processor cores and a local cache hierarchy. The processor cores include, for example, CPU cores, GPU cores, DSP cores, parallel processor cores, or a combination thereof. The local cache hierarchy of a processing client includes one or more levels of cache. In some embodiments, at least one of processing modules 104-106 differs from at least one other of processing modules 104-106 (i.e., processing modules 104-106 are heterogeneous). In other embodiments, processing modules 104-106 are homogeneous.

System memory 112 stores data on behalf of processing modules 104 and 106. In the illustrated embodiment, at least some of the data is stored in blocks of memory called "pages." In the illustrated embodiment, these pages are grouped into page groups 152-156. The processing modules 104 and 106 access the data stored at the pages of the page groups 152-156 of system memory 112 using virtual addresses of programs that are mapped to physical addresses in the system memory 112. Page groups 152-156 represent groups of pages having different respective page sizes (e.g., 1 KB, 8 KB, and 128 KB). Although three page groups 152-156 are shown, in other embodiments, additional or fewer page groups are contemplated. In some embodiments, the memory addresses of the pages of page groups 152-156 are contiguous. In other cases, the memory addresses of the pages of page groups 152-156 are not contiguous.

Translations of virtual addresses to physical addresses are stored in page table 150. Each program that is executing in the processing system 100 has a corresponding page table. The page table for a program translates virtual addresses that are being used by the program to physical addresses in system memory 112. In some embodiments, the entirety of the page table for a program is stored in system memory 112. In some embodiments, processing system 100 includes multiple system memories and the page table for a program is stored across a plurality of system memories. In some embodiments, only a portion of a virtual address is translated into a physical address. For example, in some embodiments, a least significant 8 bits of a virtual address are appended onto a most significant 4 bits of a physical address to generate a complete physical address. Accordingly, in some embodiments, the page table does not translate complete physical addresses. In other embodiments, the page table translates complete physical addresses.

Virtual-to-physical address translations that are frequently used by one or more of processing modules 104 and 106 are stored in one or more of TLBs 122 and 126. As described further below with reference to FIG. 2, the address translations are stored in respective TLB entries of the TLB. Processing modules 104 and 106 are therefore able to retrieve the address translations from TLBs 122 and 126 without the overhead of searching for the translation in page tables 150. TLB entries are evicted from TLBs 122 and 126 to make room for new TLB entries according to a TLB replacement policy. Similar to the page table, in some embodiments, the TLB does not translate complete physical addresses. In other embodiments, the TLB translates complete physical addresses.

Memory controller 108 operates as the interface between system memory 112 and the other components of processing system 100. Thus, data to be cached in a local cache hierarchy of a processing client typically is manipulated as blocks of data referred to as "cache lines", and which are addressed or otherwise located in a memory hierarchy using a physical address of system memory 112. Cache lines are accessed from the system memory 112 by the memory controller 108 in response to access requests from a processing client, and the cache lines are installed, or cached, in one or more caches of the processing client. Likewise, when a cache line containing modified data is evicted from a local cache hierarchy of a processing client, and thus needs to be updated in system memory 112, memory controller 108 manages this write-back process. Additionally, in some embodiments, memory controller 108 manages allocation of pages of system memory 112 to programs. For example, in some cases, memory controller 108 receives requests (e.g., from processing modules 104 and 106) to allocate pages having requested page sizes. In response to the requests, memory controller 108 identifies an available (e.g., unallocated) page having the requested size and allocates the identified page to the program. Alternatively, if no page having the requested size is available, in some cases, memory controller 108 identifies an available page having a different size (e.g., a larger page) and allocates that page to the program. Subsequently, in response to a deallocation request, memory controller 108 deallocates one or more pages allocated to a program. In some embodiments, processing system 100 includes multiple system memories 112. Additionally, in some embodiments, system memory 112 includes one or more of TLBs 122, 126.

I/O devices 114, 115 operate to transfer data into and out of processing system 100 using DMA access operations. For example, one of the I/O devices 114, 115 can include a network interface card (NIC) for connecting the node to a network for receiving and transmitting data, or hard disk drive (HDD) or other mass storage device for non-volatile storage of relatively large quantities of data for use by processing modules 104-106, and the like. In at least one embodiment, I/O hub 110 manages I/O devices 114, 115 and serves as an interface between data fabric 102 and I/O devices 114, 115. To illustrate, in some embodiments, I/O hub 110 includes a Peripheral Component Interconnect Express (PCIe) root complex so as to operate as a PCIe interconnect between I/O devices 114, 115 and data fabric 102.

Data fabric 102 generally transports commands, data, requests, status communications, and other signaling among the other components of processing system 100, and between processing system 100 and other nodes 141. One such subset of these transport operations is the storage of data provided by the I/O devices 114, 115 at system memory 112 for use by one or more of processing modules 104-106. I/O agent 140 operates as a coherent agent for I/O hub 110 and I/O devices 114, 115. Further, in some embodiments, transport layer 130 is coupled to the corresponding transport layer of one or more other nodes 141 or to processing modules 104-16 via one or more bridge components or coherent agents (not shown). In various embodiments, data fabric 102 is compatible with one or more standardized interconnect specifications, such as a HyperTransport™ specification or an Infinity Fabric™ specification.

Figure 2:
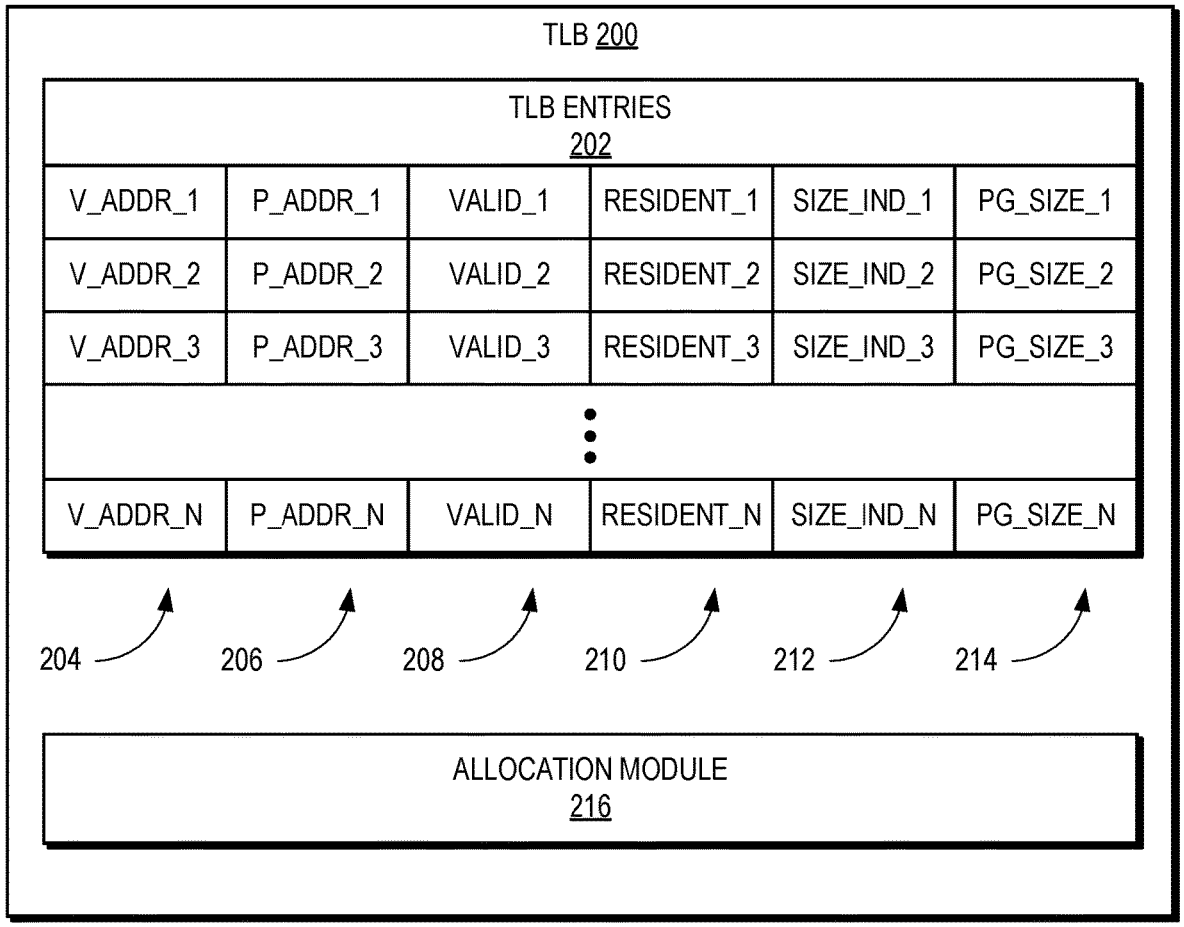
FIG. 2 is a block diagram of an example TLB in accordance with some embodiments.

FIG. 2 is a block diagram illustrating an example TLB 200 in accordance with some embodiments. In some embodiments, TLB 200 corresponds to TLB 122, TLB 126, or both of FIG. 1. In other embodiments, TLB 200 corresponds to a different processing system that includes additional or fewer components than processing system 100 (e.g., only one processing module or more than one system memory). In the illustrated embodiment, TLB 200 includes TLB entries 202 and allocation module 216. Although the illustrated embodiment shows a specific configuration of components, in various embodiments, other combinations of components are contemplated. For example, in other embodiments, TLB 200 includes additional or fewer components (e.g., TLB 200 does not include allocation module 216).

As described above, TLB 200 stores virtual-to-physical address translations that are frequently used by a processing module in TLB entries 202. In the illustrated embodiment, TLB entries 202 include various fields 204-212. In particular, occupied TLB entries 202 each include a respective virtual address or partial virtual address in field 204, a respective physical address or partial physical address in field 206, whether the virtual and physical addresses are valid in field 208, whether the virtual and physical addresses are resident in the entry in field 210, a size indicator of a requested page that includes the physical address stored in field 206 is stored in field 212, and a size of a page allocated to the entry in field 214. In some embodiments, as described below with reference to FIGS. 3 and 4, the page size indication stored in fields 212 does not match the page size stored in fields 214. In some embodiments, the page size indication stored in fields 212 is not the same value indicated by the TLB request and is instead based on the value indicated by the TLB request. For example, the TLB request requests a 2 KB page and a 1 is stored in the respective field 212, where 1 corresponds to a 2 KB page. In other embodiments, the page size indication stored in fields 212 is the same value indicated by the TLB request. In some embodiments, the page size indication stored in fields 212 is a one-bit value (e.g., because the processing system only allocates pages of two page sizes to programs that use TLB 200). In some embodiments, fields 204-212 are located in a different order. Additionally, in some embodiments, TLB entries 202 include additional fields, such as an indicator of an associated program. Further, in some embodiments, TLB entries 202 include fewer fields, such as no indication of whether virtual and physical addresses are resident, or no indication of the page size allocated to the entry.

As described below with reference to FIG. 3, in some cases, because TLB 200 assumes that only a single entry will be identified as a TLB hit, if multiple entries are identified as hits, erroneous operation occurs. For example, if a first and a second entry of TLB entries 202 are identified as a TLB hit in response to a TLB request, a physical address of a third entry is returned. To prevent at least some erroneous operation, in the illustrated embodiment, TLB 200 is indexed based on the page size indication stored in fields 212. Accordingly, in response to a TLB request (e.g., from a program or on behalf of a program) that includes a virtual address and a page size indication, TLB 200 searches TLB entries 202 and, if a match is identified (e.g., a TLB entry marked as valid and resident stores the virtual address and a corresponding page size indication), a physical address is returned. However, as further described below with reference to FIG. 4, if a page size indication of a TLB request fails to match an entry, even if a virtual address matches, a separate TLB entry is allocated (e.g., a second entry that maps the same virtual address to the same physical address). As a result, in some cases, erroneous operation is prevented.

In the illustrated embodiment, TLB 200 includes allocation module 216 that manages allocation of TLB entries 202 and of memory pages to programs. For example, in some embodiments, in response to receiving a TLB request that includes a virtual address and an indication of a size of a page to store the corresponding physical address, TLB 200 determines whether a TLB hit occurs, and if a TLB miss occurs, allocation module 216 allocates a TLB entry that stores the virtual address in field 204 and the indication of the requested page size in field 212. In some embodiments, the physical address is stored in field 206 and the page size of the page that includes the physical address is stored in field 214 subsequent to storing the virtual address in field 204 and the size indicator in field 212. In some embodiments, TLB 200 functions as if a page of the requested size is allocated to the program and stores the page size in field 214 when the virtual address is stored in field 204 and the size indicator is stored in field 212. Further, in some embodiments, allocation module 216 tracks a number of available pages of each page size, identifies whether a page of the requested page size is available, and stores an indication of an allocated page size in field 214 before an indication is received of the allocated page (e.g., from a memory controller or the memory). In some embodiments, allocation module 216 manages the allocation of the pages. In some cases, as described above, a first page having a different size than a requested size is allocated to a program. In some embodiments, when a second page of the requested size becomes available, the second page is allocated to the program, data written to the first page is moved, and the first page is deallocated from the program. In other embodiments, the program proceeds using the first page.

Figure 3:
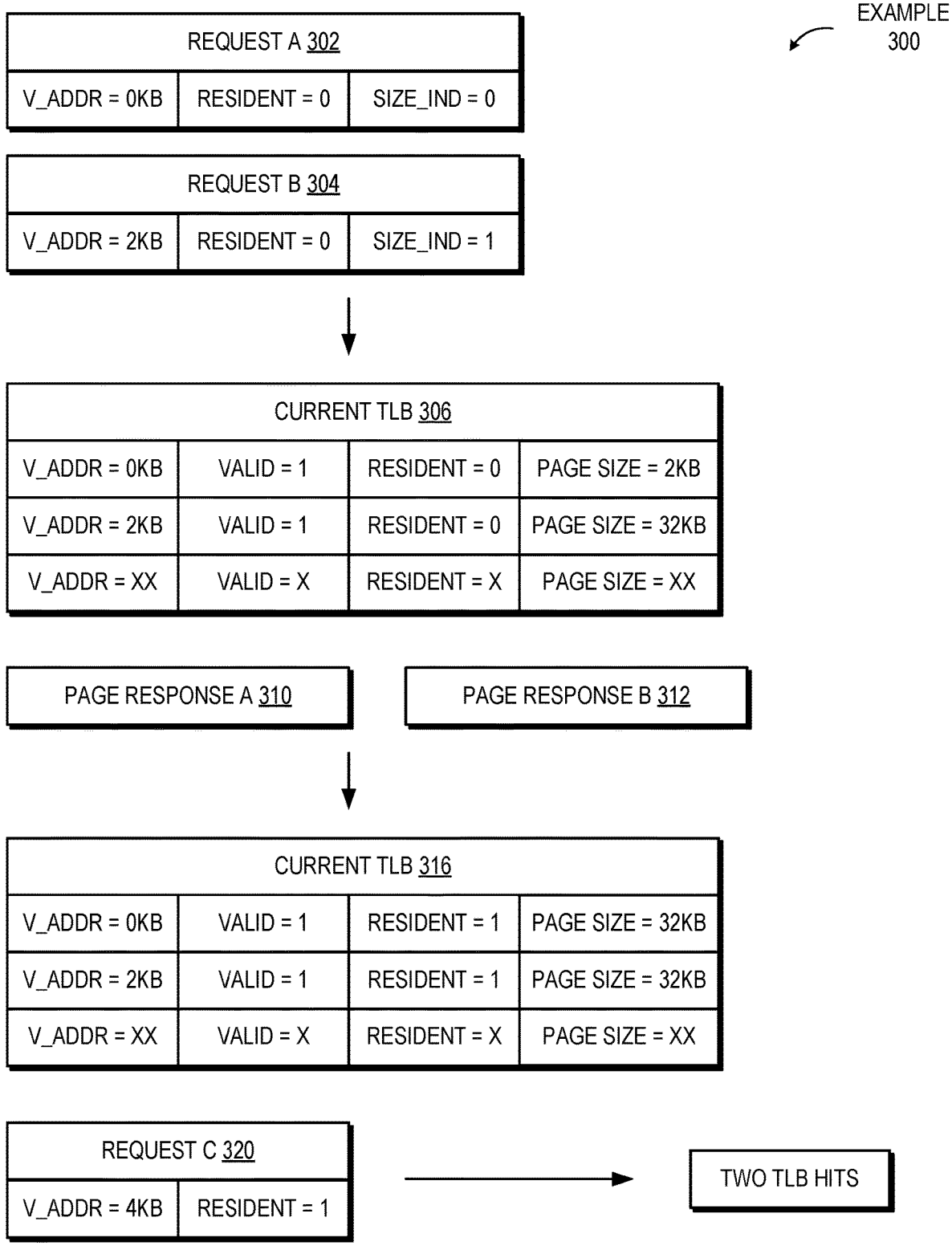
FIG. 3 is a block diagram of a first example TLB entry allocation process in accordance with some embodiments.
Figure 4:
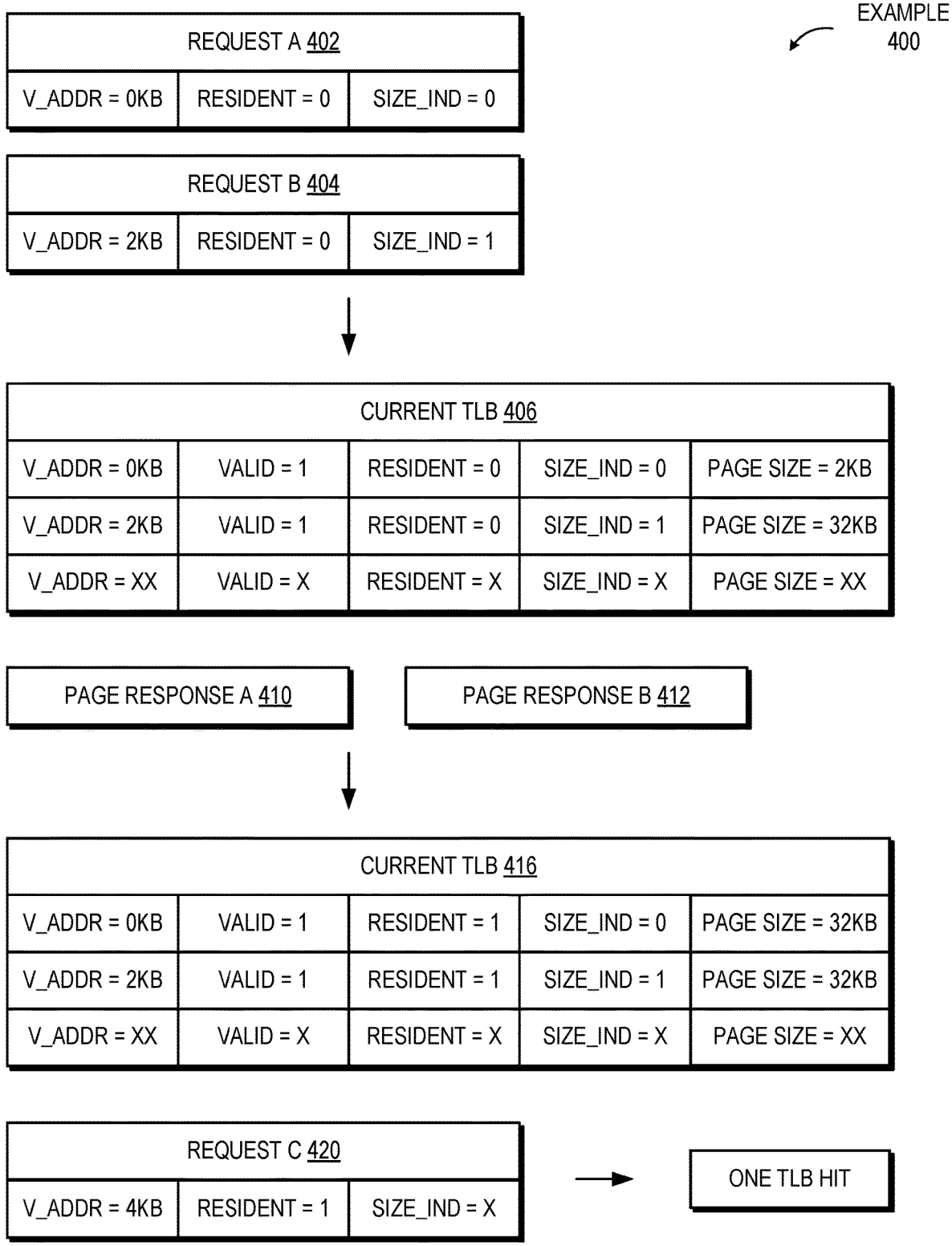
FIG. 4 is a block diagram of a second example TLB entry allocation process in accordance with some embodiments.

FIGS. 3 and 4 illustrate example 300 and 400 TLB entry allocation processes in accordance with at least some embodiments. As described above, in some embodiments, if a TLB receives a certain series of TLB requests, in some cases, erroneous operation occurs. FIG. 3 illustrates how one embodiment of a TLB that is not indexed based on a size indicator responds to such a series of TLB requests and FIG. 4 illustrates how a TLB that is indexed based on a size indicator responds to the same series of TLB requests.

Turning to FIG. 3, in example 300, the system memory includes pages having size 2 KB and 32 KB. Request A 302, which indicates a virtual address of 0 KB, indicates that a corresponding entry is not resident in the TLB, and includes a requested size indication of 0, which corresponds to 2 KB, is received at the TLB. Additionally, request B 304, which indicates a virtual address of 2 KB, indicates that a corresponding entry is not resident in the TLB, and includes a requested size indication of 1, which corresponds to 32 KB, is received at the TLB. Requests A and B 302 and 304 are received on behalf of a single program. As a result, the TLB results in current TLB 306, where entries are allocated to each of request A 302 and request B 304. For purposes of illustration, although in some embodiments current TLBs 306 and 316 correspond to TLB 200, not all fields of TLB 200 are illustrated.

As described above with reference to FIGS. 1 and 2, in some embodiments, entries are stored prior to receiving indications of which pages are allocated to the entries. Page response A 310 is received, which indicates a physical address and a page size for request A 302. Similarly, page response B 312 is received, which indicates a physical address and a page size for request B 304. In example 300, even though a 2 KB page was requested by request A 302, a 32 KB page is allocated. Additionally, a 32 KB page is allocated for request B 304. As a result, the TLB results in current TLB 316, where the page size of the entry allocated to request A 302 is updated to 32 KB and the entries allocated to request A 302 and request B 304 are marked as resident.

In example 300, when request C 320 is received, which indicates a virtual address of 4 KB and that a corresponding entry is resident in the TLB, both the entry corresponding to request A 302 and the entry corresponding to request B 304 are identified as TLB hits due to the stored page sizes. In the illustrated embodiment, because current TLB 316 is not designed to have multiple entries identified as TLB hits, in some cases, erroneous operation occurs. For example, in some cases, the entry storing V_ADDR=XX is identified as the TLB hit, presenting a potential data vulnerability.

Turning to FIG. 4, in example 400, similar to example 300, the system memory includes pages having size 2 KB and 32 KB. Request A 402, which indicates a virtual address of 0 KB, indicates that a corresponding entry is not resident in the TLB, and includes a requested size indication of 0, which corresponds to 2 KB, is received at the TLB. Additionally, request B 404, which indicates a virtual address of 2 KB, indicates that a corresponding entry is not resident in the TLB, and includes a requested size indication of 1, which corresponds to 32 KB, is received at the TLB. Requests A and B 402 and 404 are received on behalf of a single program. As a result, the TLB results in current TLB 406, where entries are allocated to each of request A 402 and request B 404. For purposes of illustration, although in some embodiments current TLBs 406 and 416 correspond to TLB 200, not all fields of TLB 200 are illustrated.

As described above with reference to FIGS. 1 and 2, in some embodiments, entries are stored prior to receiving indications of which pages are allocated to the entries. Page response A 410 is received, which indicates a physical address and a page size for request A 402. Similarly, page response B 412 is received, which indicates a physical address and a page size for request B 404. In example 400, even though a 2 KB page was requested by request A 402, a 32 KB page is allocated. Additionally, a 32 KB page is allocated for request B 404. As a result, the TLB results in current TLB 416, where the page size of the entry allocated to request A 402 is updated to 32 KB and the entries allocated to request A 402 and request B 404 are marked as resident.

In example 400, current TLB 416 is indexed based on the requested page size indications. Accordingly, request C 420 includes a requested page size indication in addition to the virtual address of 4 KB and that a corresponding entry is resident in the TLB, as in example 300. As a result, only the entry corresponding to request A 402 or the entry corresponding to request B 404 is identified as TLB hits due to the stored page sizes, preventing the potential erroneous operation of example 300.

Figure 5:
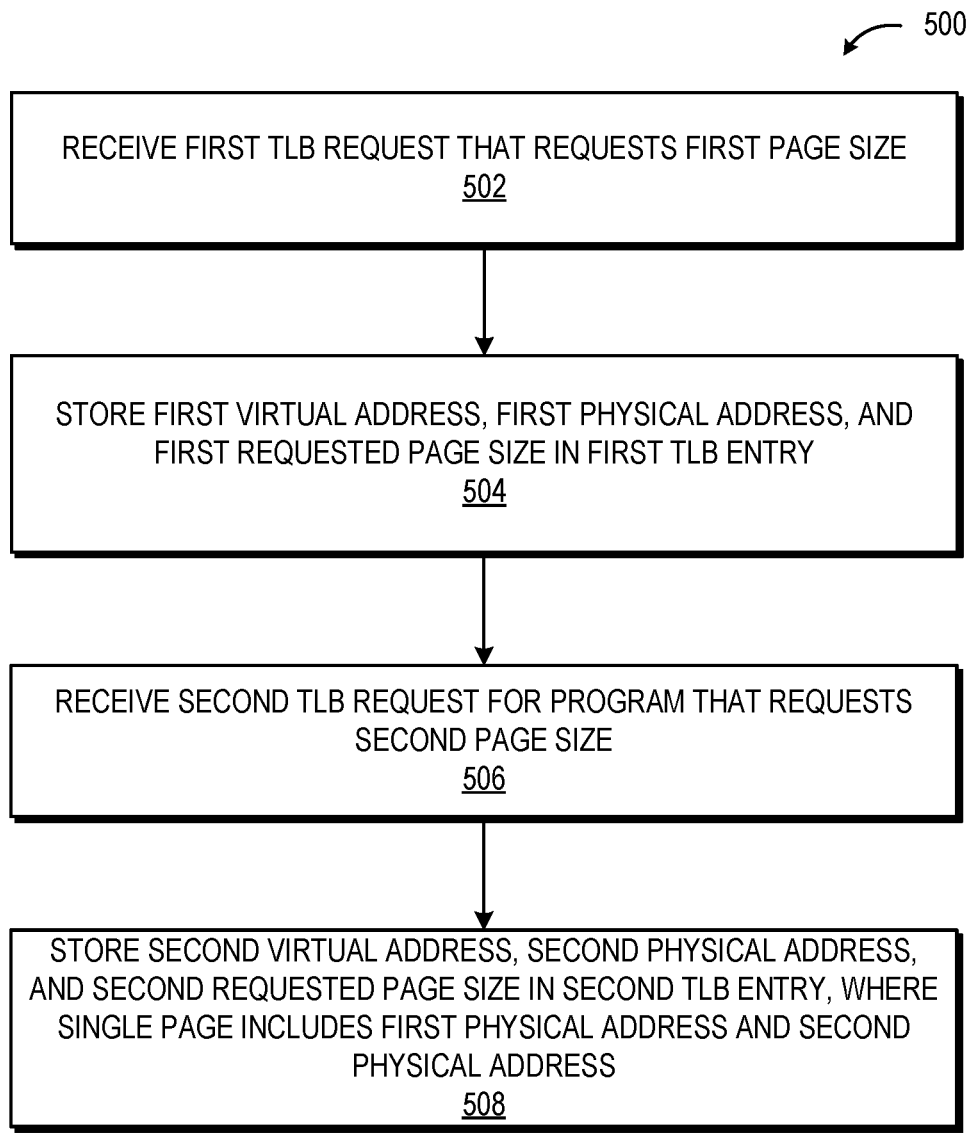
FIG. 5 is a flow diagram of a method of allocating TLB entries in accordance with some embodiments.

FIG. 5 is a flow diagram illustrating a method 500 of allocating TLB entries in accordance with some embodiments. In some embodiments, method 500 is initiated by one or more processors in response to one or more instructions stored by a computer readable storage medium. In some embodiments, portions of some blocks of method 500 occur at different times. For example, in some cases, the first virtual address of 504 is stored at a different time than the first physical address. Additionally, in some embodiments, various portions of method 500 occur in a different order than is illustrated. For example, in some cases, some or all of block 506 occurs before or at the same time as some or all of block 504.

At block 502, a TLB request that requests a first page size is received. For example, request A 402 that requests a 2 KB page is received. At block 504, a first virtual address, a first physical address, and a first requested page size are stored in a first TLB entry. For example, a virtual address of 0 KB, a corresponding physical address, and a size indicator with a value of 0 indicating the 2 KB requested page size are stored in a first entry of current TLB 416.

At block 506, a TLB request that requests a second page size is received. For example, request B 404 that requests a 32 KB page is received. At block 508, a second virtual address, a second physical address, and a second requested page size are stored in a second TLB entry. A single physical page includes both the first physical address and the second physical address. Accordingly, in some embodiments, the first physical address is equal to the second physical address. For example, even though 2 KB is within the 32 KB of the first page, a virtual address of 2 KB, a corresponding physical address, and a size indicator with a value of 1 indicating the 32 KB requested page size are stored in a second entry of current TLB 416. Accordingly, a method of allocating TLB entries is depicted.

In some embodiments, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," etc.) are described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. A system comprising:
a processor; and
a translation lookaside buffer (TLB) comprising a plurality of TLB entries, wherein the TLB is configured to store requested page size indications that are based on page sizes requested by TLB requests corresponding to the TLB entries, and wherein the TLB is configured to allocate a plurality of entries in response to receiving a plurality of respective TLB requests from the processor for a program, wherein the plurality of TLB requests each indicate a same virtual address but different respective requested indications of page sizes.

2. The system of claim 1, wherein:
the TLB is configured to store a first requested page size indication and a second requested page size indication in respective one-bit fields in the respective TLB entries.

3. The system of claim 2, wherein:
in response to receiving a first TLB request that requests a first page size, the TLB is configured to store a first requested page size indication that indicates the first page size in a first entry corresponding to the first TLB request.

4. The system of claim 3, wherein:
subsequent to storing the first requested page size indication, in response to receiving an indication that no page having the first page size is available, the TLB is configured to store a second requested page size indication that indicates a second page size in the first entry.

5. The system of claim 1, wherein:
the TLB is configured to register a TLB hit of a third entry in response to a request identifying TLB hits for both a first entry and a second entry.

6. A method comprising:
receiving a first translation lookaside buffer (TLB) request for a program, wherein the first TLB request comprises a first virtual address and a first indication of a size of a page;
storing the first virtual address, a corresponding first physical address of a first page, and a first requested page size indication in a first entry of the TLB, wherein the first requested page size indication is based on the first indication;
receiving a second TLB request for the program, wherein the second TLB request comprises a second virtual address and a second indication of a size of a page, wherein the first page includes a second physical address that corresponds to the second virtual address, and wherein the page size of the second indication is different from the page size of the first indication; and
storing the second virtual address, the first physical address of the first page, and a second requested page size indication in a second entry of the TLB, wherein the second requested page size indication is based on the second indication.

7. The method of claim 6, further comprising:
receiving a third TLB request for the program, wherein the third TLB request comprises the first virtual address and the second indication;
identifying the second TLB entry as a TLB hit;
reading the first physical address of the first page from the second TLB entry; and
outputting the first physical address.

8. The method of claim 6, further comprising:
in response to receiving the first TLB request, identifying that no page having the page size of the first indication is available; and
allocating the first page to the program, wherein the first page has a different page size from the page size of the first indication.

9. The method of claim 8, further comprising:
prior to identifying that no page having the page size of the first indication is available, storing the size of the first page in the first entry.

10. The method of claim 6, further comprising:
receiving a third TLB request for the program, wherein the third TLB request comprises a third virtual address and a third indication of a size of a page, wherein the first page does not include a third physical address that corresponds to the third virtual address; and
storing the third virtual address, a corresponding third physical address of a second page, and a third requested page size indication in a third entry of the TLB, wherein the third requested page size indication is based on the third indication.

11. The method of claim 6, further comprising:
in response to receiving the first TLB request, identifying that the first page is available and has the page size of the first indication; and
allocating the first page to the program.

12. The method of claim 11, further comprising:

prior to identifying that the first page is available, storing a size of a second page in the first entry, wherein the size of the second page is different from the size of the first page.

13. The method of claim 11, wherein:

allocating the first page to the program comprises requesting that a memory controller allocate the first page to the program.

14. The method of claim 6, further comprising:

in response to receiving the first TLB request, identifying that no page having the page size of the first indication is available; and allocating a second page to the program, wherein the second page has a different page size from the page size of the first indication.

15. The method of claim 14, further comprising:

subsequent to allocating the second page to the program, identifying that the first page is available, wherein the first page has the page size of the first indication;

allocating the first page to the program; and deallocating the second page from the program.

16. The method of claim 6, wherein:

the first physical address of the first page and the size of the first page are stored in the first entry subsequent to the first virtual address being stored in the first entry.

17. A translation lookaside buffer (TLB) comprising:

a plurality of TLB entries each configured to store:
   a virtual address;
   a corresponding physical address; and
   an indication of a requested size of a page that comprises the corresponding physical address; and an allocation module configured to allocate the plurality of TLB entries to one or more programs in response to receiving one or more TLB requests that include one or more respective virtual addresses and one or more respective indications of page sizes.

18. The TLB of claim 17, wherein:

the plurality of TLB entries are each further configured to store an indication of a size of a page that comprises the corresponding physical address.

19. The TLB of claim 17, wherein:

the allocation module is further configured to allocate pages from a memory to the one or more programs.

20. The TLB of claim 17, wherein:

a memory controller is configured to allocate pages from a memory to the one or more programs.

* * * * *